US010920164B2

(12) United States Patent
Klein et al.

(10) Patent No.: US 10,920,164 B2
(45) Date of Patent: Feb. 16, 2021

(54) VISCOSITY INDEX IMPROVER WITH IMPROVED SHEAR-RESISTANCE AND SOLUBILITY AFTER SHEAR

(71) Applicant: Evonik Operations GmbH, Essen (DE)

(72) Inventors: Rebecca Klein, Frankfurt am Main (DE); Holger Becker, Darmstadt (DE); Dieter Janβen, Groβ-Umstadt (DE); Sebastian Seibel, Darmstadt (DE)

(73) Assignee: Evonik Operations GmbH, Essen (DE)

( * ) Notice: Subject to any disclaimer, the term of this patent is extended or adjusted under 35 U.S.C. 154(b) by 96 days.

(21) Appl. No.: 16/217,209

(22) Filed: Dec. 12, 2018

(65) Prior Publication Data

US 2019/0177641 A1 Jun. 13, 2019

(30) Foreign Application Priority Data

Dec. 13, 2017 (EP) .................................... 17206916

(51) Int. Cl.
| | | |
|---|---|---|
| *C10M 145/14* | (2006.01) | |
| *C08F 220/18* | (2006.01) | |
| *C08F 212/08* | (2006.01) | |
| *C10M 169/04* | (2006.01) | |
| *C08F 290/04* | (2006.01) | |
| *C10N 20/02* | (2006.01) | |
| *C10N 20/04* | (2006.01) | |
| *C10N 20/00* | (2006.01) | |
| *C10N 30/02* | (2006.01) | |
| *C10N 30/08* | (2006.01) | |
| *C10N 30/00* | (2006.01) | |
| *C10N 40/04* | (2006.01) | |

(52) U.S. Cl.
CPC ......... *C10M 145/14* (2013.01); *C08F 212/08* (2013.01); *C08F 220/18* (2013.01); *C08F 290/048* (2013.01); *C10M 169/041* (2013.01); *C08F 220/1804* (2020.02); *C08F 2800/20* (2013.01); *C10M 2203/003* (2013.01); *C10M 2203/1025* (2013.01); *C10M 2205/0285* (2013.01); *C10M 2209/084* (2013.01); *C10N 2020/019* (2020.05); *C10N 2020/02* (2013.01); *C10N 2020/04* (2013.01); *C10N 2020/065* (2020.05); *C10N 2020/071* (2020.05); *C10N 2030/02* (2013.01); *C10N 2030/08* (2013.01); *C10N 2030/68* (2020.05); *C10N 2040/04* (2013.01)

(58) Field of Classification Search
None
See application file for complete search history.

(56) References Cited

U.S. PATENT DOCUMENTS

| | | | |
|---|---|---|---|
| 4,316,973 | A | 2/1982 | Kennedy |
| 4,859,210 | A | 8/1989 | Franz et al. |
| 5,565,130 | A | 10/1996 | Omeis et al. |
| 5,597,871 | A | 1/1997 | Auschra et al. |
| 6,599,864 | B1 | 7/2003 | Bertomeu et al. |
| 8,067,349 | B2 | 11/2011 | Stohr et al. |
| 9,783,630 | B2 | 10/2017 | Stoehr et al. |
| 2011/0306533 | A1 | 12/2011 | Eisenberg et al. |
| 2016/0097017 | A1 | 4/2016 | Eisenberg et al. |

FOREIGN PATENT DOCUMENTS

| | | |
|---|---|---|
| EP | 0 621 293 A1 | 10/1994 |
| EP | 0 668 342 A1 | 8/1995 |
| EP | 0 776 959 A1 | 6/1997 |
| EP | 1 029 029 A1 | 8/2000 |
| EP | 3 093 334 A1 | 11/2016 |
| GB | 2270317 | 3/1994 |
| JP | S63-175096 | 7/1988 |
| WO | 96/30421 A1 | 10/1996 |
| WO | 97/18247 A1 | 5/1997 |
| WO | 97/21788 A1 | 6/1997 |
| WO | 97/47661 A1 | 12/1997 |
| WO | 98/01478 A1 | 1/1998 |
| WO | 98/40415 A1 | 9/1998 |
| WO | 99/10387 A1 | 3/1999 |
| WO | 99/20720 A1 | 4/1999 |
| WO | 99/41332 A1 | 8/1999 |
| WO | 00/08115 A1 | 2/2000 |
| WO | 00/14179 A1 | 3/2000 |
| WO | 00/14183 A1 | 3/2000 |
| WO | 00/14187 A2 | 3/2000 |
| WO | 00/14188 A2 | 3/2000 |
| WO | 00/15736 A2 | 3/2000 |
| WO | 01/18156 A1 | 3/2001 |
| WO | 01/57166 A1 | 8/2001 |
| WO | 2004/083169 A1 | 9/2004 |
| WO | 2007/003238 A1 | 1/2007 |
| WO | 2009/007147 A1 | 1/2009 |
| WO | 2010/102903 A1 | 9/2010 |

(Continued)

OTHER PUBLICATIONS

European Search Report dated Apr. 18, 2019 in EP 18210921.5 (7 pages).

*Primary Examiner* — Vishal V Vasisth

(74) *Attorney, Agent, or Firm* — Taylor English Duma LLP; Philip P. McCann

(57) ABSTRACT

The invention relates to a poly alkyl(meth)acrylate polymer comprising a combination of polybutadiene-based monomers having different average molecular weight, lubricant compositions comprising the polymer, a method for manufacturing the polymer and the use of the polymer as a viscosity index improver in a lubricating oil composition.

20 Claims, No Drawings

(56) References Cited

FOREIGN PATENT DOCUMENTS

| | | |
|---|---|---|
| WO | 2010/142789 A1 | 12/2010 |
| WO | 2013/189951 A1 | 12/2013 |
| WO | 2014/170169 A1 | 10/2014 |
| WO | 2018/041755 A1 | 3/2018 |
| WO | 2018/083027 A1 | 5/2018 |
| WO | 2018/114673 A1 | 6/2018 |

VISCOSITY INDEX IMPROVER WITH IMPROVED SHEAR-RESISTANCE AND SOLUBILITY AFTER SHEAR

CROSS REFERENCE TO RELATED APPLICATIONS

This application claims the benefit of European Application No. 17206916.3 filed Dec. 13, 2017, the disclosure of which is incorporated herein by reference in its entirety.

FIELD

The invention relates to a poly alkyl (meth)acrylate polymer comprising a combination of polybutadiene-based monomers having different average molecular weight, lubricant compositions comprising the polymer, a method for manufacturing the polymer and the use of the polymer as an additive for lubricant compositions for improving the shear-resistance.

BACKGROUND

The more and more stringent $CO_2$ emission regulations drive the automotive industry to systems that provide better fuel economy. Despite the hardware changes that are possible, one lever to reduce fuel-economy is to reduce the viscosity of the lubricant applied in the transmission or engine. However, the steady reduction of the viscosity of the lubricant also has some limits as the viscosity has still to be high enough to provide constant protection of the metal parts. Therefore, the viscosity has to be adjusted to the optimum viscosity and should be as constant as possible over the whole temperature range.

Viscosity index improvers (VIIs) are used to improve the temperature-dependence of the lubricant that is usually measured by the viscosity index (VI), which is calculated from the kinematic viscosity at 40° C. ($KV_{40}$) and the kinematic viscosity at 100° C. ($KV_{100}$). The higher the VI the lower is the temperature-dependence of the viscosity of the lubricant, i.e. the viscosity is changing less over temperature.

In addition, the shear-resistance of the lubricant is very important: on one side, the life-times of the lubricants are getting longer asking for more resistant lubricants and on the other side, the viscosity of the fresh lubricant is already very low and a further reduction of the viscosity due to shear-losses might cause a failure of the metal parts. Further, the degradation of certain components of the lubricant composition due to shear-loss may lead to the formation of insoluble fragments, which can, for example, block filters or other hardware and may lead to transmission failure. Therefore, it is essential to provide viscosity index improvers that do not tend to build up insoluble fragments after shearing.

Poly alkyl(meth)acrylates are known to act as good viscosity index improvers in lubricants.

Patent applications WO 2009/007147 and WO 2010/142789 disclose the use of polymers comprising polybutadiene-derived macromonomers as viscosity index improvers, wherein the macromonomers have a molecular weight of 500 to 50,000. However, no indication is given that these polymers have superior shear- and fragment-stability.

Patent application WO 2007/003238 describes the use of polymers comprising polybutadiene-derived macromonomers as viscosity index improvers, wherein the macromonomers have a molecular weight of 500 to 50,000 g/mol. No indication is given that these VIIs are beneficial in terms of shear-stability.

Patent application EP 3 093 334 A1 discloses polymers comprising polybutadiene-derived macromonomers as viscosity index improvers, wherein the macromonomers have a molecular weight of 1000 to 25,000 g/mol. The working examples of this application use one macromonomer with molecular weights of either 1,100, 3,000 or 5,000 g/mol. However, when looking at the results of shear-stability measurements no improvement can be found when going to lower molecular weights (working examples 1, 4 and 7). Additionally, the application does not teach how to improve fragment-stability.

SUMMARY

The aim of the invention is to provide viscosity index improvers for the use in lubricant compositions that display improved shear-stability and solubility after shear as compared to the viscosity index improvers known from the prior art. In particular, the invention aims at providing viscosity index improvers that give a combination of high viscosity index, shear-stability and solubility after shear.

It was found that including a special combination of two monomers based on hydrogenated polybutadienes with different average molecular weights in poly alkyl(meth)acrylate polymers leads to an excellent shear-stability and high viscosity index (VI) of the polymers. The polymers of the invention also show good fragment-stability, i.e. solubility after shearing. The combination of excellent shear-stability, fragment-stability and high VI cannot be obtained when only a single monomer based hydrogenated polybutadiene is used. The combination of the two monomers is essential to achieve these effects.

DETAILED DESCRIPTION OF THE INVENTION

Polymers of the Invention

In a first aspect, the invention relates to a poly alkyl(meth)acrylate polymer, obtainable by polymerizing a monomer composition comprising:

(a) 5 to 35% by weight of one or more esters of (meth)acrylic acid and a first hydroxylated hydrogenated polybutadiene having a number-average molecular weight of 500 to less than 3,000 g/mol, based on the total weight of the monomer composition;

(b) 1 to 15% by weight of one or more esters of (meth)acrylic acid and a second hydroxylated hydrogenated polybutadiene having a number-average molecular weight of 3,000 to 10,000 g/mol, based on the total weight of the monomer composition;

(c) 4 to 98% by weight of one or more $C_{1-30}$ alkyl(meth)acrylates, based on the total weight of the monomer composition, wherein the total weight of monomers (a) and (b) is at least 25% by weight, based on the total weight of the monomer composition, and wherein the total weight of monomers (a), (b) and (c) is at least 35% by weight, based on the total weight of the monomer composition.

Unless otherwise noted, the weight amounts of the monomers are given relative to the total amount of monomers used, namely, the total weight of the monomer composition.

Preferably, the amounts of (a) to (c) add up to 100% by weight.

A polymer in the context of this invention comprises a first polymer, which is also referred to as backbone or main chain, and a multitude of further polymers which are referred to as side chains and are bonded covalently to the backbone. In the present case, the backbone of the polymer is formed by the interlinked unsaturated groups of the mentioned (meth)acrylic acid esters. The alkyl groups and the hydrogenated polybutadiene chains of the (meth)acrylic esters form the side chains of the polymer. The reaction product of one or more ester of (meth)acrylic acid and one hydroxylated hydrogenated polybutadiene (component (a) or component (b)) is also referred in the present invention as macromonomer.

The term "(meth)acrylic acid" refers to acrylic acid, methacrylic acid and mixtures of acrylic acid and methacrylic acid; methacrylic acid being preferred. The term "(meth)acrylate" refers to esters of acrylic acid, esters of methacrylic acid or mixtures of esters of acrylic acid and methacrylic acid; esters of methacrylic acid being preferred.

The polymers according to the invention may preferably have a weight-average molecular weight ($M_w$) of 10,000 to 1,000,000 g/mol. Polymers of different weight-average molecular weight may be used for different applications, for example as additives for engine oils, transmission fluids and traction oils. The weight-average molecular weight of the polymers may preferably be selected depending on the intended application according to the following table:

| Application | preferably $M_w$ (g/mol) | more preferably $M_w$ (g/mol) | most preferably $M_w$ (g/mol) |
|---|---|---|---|
| Engine oil | 150,000 to 1,000,000 | 230,000 to 1,000,000 | 300,000 to 800,000 |
| Transmission fluid | 15,000 to 350,000 | 30,000 to 350,000 | 40,000 to 200,000 |
| Traction oil | 10,000 to 600,000 | 12,000 to 230,000 | 15,000 to 150,000 |

Preferably, the weight-average molecular weight ($M_w$) of the polymers according to the invention is in the range of 15,000 to 350,000 g/mol, more preferably 30,000 to 350,000 g/mol, even more preferably 40,000 to 200,000 g/mol, most preferably 60,000 to 150,000 g/mol. Polymers having this weight-average molecular weight are especially suited for use in transmission fluids, such as automatic transmission fluids, manual transmission fluids and belt-continuously variable transmission fluids.

Preferably, the number-average molecular weight ($M_n$) of the polymers according to the invention is in the range of 5,000 to 50,000 g/mol, more preferably 15,000 to 40,000 g/mol, most preferably 20,000 to 35,000 g/mol.

Preferably, the polydispersity index (PDI) of the polymers according to the invention is in the range of 1.5 to 4.5, more preferably 2 to 4, most preferably 2.7 to 3.6. The polydispersity index is defined as the ratio of weight-average molecular weight to number-average molecular weight ($M_w/M_n$).

The weight-average and number-average molecular weights are determined by gel permeation chromatography (GPC) using commercially available polymethylmethacrylate standards. The determination is effected according to DIN 55672-1 by gel permeation chromatography with THF as eluent (flow rate: 1 mL/min; injected volume: 100 µL).

The polymer according to the invention can be characterized on the basis of its molar degree of branching ("f-branch"). The molar degree of branching refers to the percentage in mol % of macromonomers (components (a) and (b)) used, based on the total molar amount of all the monomers in the monomer composition. The molar amount of the macromonomers used is calculated on the basis of the number-average molecular weight $M_n$ of the macromonomers. The calculation of the molar degree of branching is described in detail in WO 2007/003238 A1, especially on pages 13 and 14, to which reference is made here explicitly.

Preferably, the polymers have a molar degree of branching $f_{branch}$ of 0.1 to 5 mol %, more preferably 1 to 4.5 mol % and most preferably 1.5 to 2.5 mol %.

Hydroxylated Hydrogenated Polybutadienes

The hydroxylated hydrogenated polybutadienes for use in accordance with the invention have a number-average molecular weight $M_n$ of 500 to less than 3,000 g/mol and 3,000 to 10,000 g/mol, respectively. Because of their high molecular weight, the hydroxylated hydrogenated polybutadienes can also be referred to as macroalcohols in the context of this invention. The corresponding esters of (meth)acrylic acid can also be referred to as macromonomers in the context of this invention.

By combining two macromonomers of different number-average molecular weight in the polymers according to the invention, a drastically improved solubility after shear can be obtained while maintaining an excellent shear-resistance of the polymers.

The number-average molecular weight $M_n$ is determined by GPC using commercially available polybutadiene standards. The determination is affected according to DIN 55672-1 by gel permeation chromatography with THF as eluent (flow rate: 1 mL/min; injected volume: 100 µL).

Preferably, the monomer composition comprises at least as much or more of the lower molecular weight macromonomer (a) than of the higher molecular weight macromonomer (b). Thus, the weight ratio of component (a) to component (b) in the monomer composition is preferably 1 or more, more preferably 1.5 to 15, even more preferably 3 to 6 and most preferably 3.5 to 6.

Preferably, the monomer composition comprises as component (a) 15 to 35% by weight, more preferably 20 to 30% by weight of one or more esters of (meth)acrylic acid and the first hydroxylated hydrogenated polybutadiene, based on the total weight of the monomer composition.

Preferably, the monomer composition comprises as component (b) 3 to 15% by weight, more preferably 4 to 10% by weight of one or more esters of (meth)acrylic acid and the second hydroxylated hydrogenated polybutadiene, based on the total weight of the monomer composition.

Preferably, the first hydroxylated hydrogenated polybutadiene has a number-average molecular weight of 1,000 to 2,750 g/mol, more preferably 1,500 to 2,500 g/mol, most preferably 1,750 to 2,250 g/mol.

Preferably, the second hydroxylated hydrogenated polybutadiene has a number-average molecular weight of 3,500 to 7,000 g/mol, more preferably 4,000 to 6,000 g/mol, most preferably 4,500 to 5,000 g/mol.

Preferably, the first and/or second hydroxylated hydrogenated polybutadienes have a hydrogenation level of at least 99%. An alternative measure of the hydrogenation level which can be determined on the polymer of the invention is the iodine number. The iodine number refers to the number of grams of iodine which can be added onto 100 g of polymer. Preferably, the polymer of the invention has an iodine number of not more than 5 g of iodine per 100 g of polymer. The iodine number is determined by the Wijs method according to DIN 53241-1:1995-05.

Preferred hydroxylated hydrogenated polybutadienes can be obtained according to GB 2270317.

As used herein, the term "hydroxylated hydrogenated polybutadiene" refers to a hydrogenated polybutadiene that comprises one or more hydroxyl groups. The hydroxylated hydrogenated polybutadiene may further comprise additional structural units, such as polyether groups derived from the addition of alkylene oxides to a polybutadiene or a maleic anhydride group derived from the addition of maleic anhydride to a polybutadiene. These additional structural units may be introduced into the polybutadiene when the polybutadiene is functionalized with hydroxyl groups.

Preference is given to monohydroxylated hydrogenated polybutadienes. More preferably, the hydroxylated hydrogenated polybutadiene is a hydroxyethyl- or hydroxypropyl-terminated hydrogenated polybutadiene. Particular preference is given to hydroxypropyl-terminated polybutadienes.

These monohydroxylated hydrogenated polybutadienes can be prepared by first converting butadiene monomers by anionic polymerization to polybutadiene. Subsequently, by reaction of the polybutadiene monomers with an alkylene oxide, such as ethylene oxide or propylene oxide, a hydroxy-functionalized polybutadiene can be prepared. The polybutadiene may also be reacted with more than one alkylene oxide units, resulting in a polyether-polybutadiene block copolymer having a terminal hydroxyl group. The hydroxylated polybutadiene can be hydrogenated in the presence of a suitable transition metal catalyst.

These monohydroxylated hydrogenated polybutadienes can also be selected from products obtained by hydroboration of (co)polymers of having a terminal double bond (e.g. as described in U.S. Pat. No. 4,316,973); maleic anhydride-ene-amino alcohol adducts obtained by an ene reaction between a (co)polymer having a terminal double bond and maleic anhydride with an amino alcohol; and products obtained by hydroformylation of a (co)polymer having a terminal double bond, followed by hydrogenation (e.g. as described in JP Publication No. S63-175096).

The macromonomers for use in accordance with the invention can be prepared by transesterification of alkyl (meth)acrylates. Reaction of the alkyl (meth)acrylate with the hydroxylated hydrogenated polybutadiene forms the ester of the invention. Preference is given to using methyl (meth)acrylate or ethyl (meth)acrylate as reactant.

This transesterification is widely known. For example, it is possible for this purpose to use a heterogeneous catalyst system, such as lithium hydroxide/calcium oxide mixture (LiOH/CaO), pure lithium hydroxide (LiOH), lithium methoxide (LiOMe) or sodium methoxide (NaOMe) or a homogeneous catalyst system such as isopropyl titanate (Ti(OiPr)$_4$) or dioctyltin oxide (Sn(OCt)$_2$O). The reaction is an equilibrium reaction. Therefore, the low molecular weight alcohol released is typically removed, for example by distillation.

In addition, the macromonomers can be obtained by a direct esterification proceeding, for example, from (meth)acrylic acid or (meth)acrylic anhydride, preferably under acidic catalysis by p-toluenesulfonic acid or methanesulfonic acid, or from free methacrylic acid by the DCC method (dicyclohexylcarbodiimide).

Furthermore, the present hydroxylated hydrogenated polybutadiene can be converted to an ester by reaction with an acid chloride such as (meth)acryloyl chloride.

Preferably, in the above-detailed preparations of the esters of the invention, polymerization inhibitors are used, for example the 4-hydroxy-2,2,6,6-tetramethylpiperidinooxyl radical and/or hydroquinone monomethyl ether.

Alkyl(Meth)Acrylates

The term "$C_{1-30}$ alkyl(meth)acrylates" refers to esters of (meth)acrylic acid and straight chain or branched alcohols having 1 to 30 carbon atoms. The term encompasses individual (meth)acrylic esters with an alcohol of a particular length, and likewise mixtures of (meth)acrylic esters with alcohols of different lengths.

Preferably, the monomer composition comprises as component (c) 5 to 90% by weight, more preferably 10 to 80% by weight of one or more $C_{1-30}$ alkyl(meth)acrylates, based on the total weight of the monomer composition.

Preferably, the $C_{1-30}$ alkyl(meth)acrylates include a mixture of $C_{1-4}$ alkyl (meth)acrylates and $C_{10-30}$ alkyl (meth)acrylates, more preferably a mixture of $C_{1-4}$ alkyl (meth)acrylates and $C_{10-18}$ alkyl (meth)acrylates, even more preferably a mixture of $C_{1-4}$ alkyl (meth)acrylates and $C_{12-14}$ alkyl (meth)acrylates.

The term "$C_{1-4}$ alkyl(meth)acrylates" refers to esters of (meth)acrylic acid and straight chain or branched alcohols having 1 to 4 carbon atoms. The term encompasses individual (meth)acrylic esters with an alcohol of a particular length, and likewise mixtures of (meth)acrylic esters with alcohols of different lengths.

Suitable $C_{1-4}$ alkyl (meth)acrylates include, for example, methyl (meth)acrylate, ethyl (meth)acrylate, n-propyl (meth)acrylate, iso-propyl (meth)acrylate, n-butyl (meth)acrylate, iso-butyl (meth)acrylate and tert-butyl (meth)acrylate. Particularly preferred $C_{1-4}$ alkyl (meth)acrylates are methyl (meth)acrylate and n-butyl (meth)acrylate. Methyl methacrylate and n-butyl methacrylate are especially preferred.

The term "$C_{10-30}$ alkyl(meth)acrylates" refers to esters of (meth)acrylic acid and straight chain or branched alcohols having 10 to 30 carbon atoms. The term encompasses individual (meth)acrylic esters with an alcohol of a particular length, and likewise mixtures of (meth)acrylic esters with alcohols of different lengths.

Suitable $C_{10-30}$ alkyl (meth)acrylates include, for example, 2-butyloctyl (meth)acrylate, 2-hexyloctyl (meth)acrylate, decyl (meth)acrylate, 2-butyldecyl (meth)acrylate, 2-hexyldecyl (meth)acrylate, 2-octyldecyl (meth)acrylate, undecyl (meth)acrylate, 5-methylundecyl (meth)acrylate, dodecyl (meth)acrylate, 2-methyldodecyl (meth)acrylate, 2-hexyldodecyl (meth)acrylate, 2-octyldodecyl (meth)acrylate, tridecyl (meth)acrylate, 5-methyltridecyl (meth)acrylate, tetradecyl (meth)acrylate, 2-decyltetradecyl (meth)acrylate, pentadecyl (meth)acrylate, hexadecyl (meth)acrylate, 2-methylhexadecyl (meth)acrylate, 2-dodecylhexadecyl (meth)acrylate, heptadecyl (meth)acrylate, 5-isopropylheptadecyl (meth)acrylate, 4-tert-butyloctadecyl (meth)acrylate, 5-ethyloctadecyl (meth)acrylate, 3-isopropyloctadecyl (meth)acrylate, octadecyl (meth)acrylate, 2-decyloctadecyl (meth)acrylate, 2-tetradecyloctadecyl (meth)acrylate, nonadecyl (meth)acrylate, eicosyl (meth)acrylate, cetyleicosyl (meth)acrylate, stearyleicosyl (meth)acrylate, docosyl (meth)acrylate, eicosyltetratriacontyl (meth)acrylate, 2-decyl-tetradecyl (meth)acrylate, 2-decyloctadecyl (meth)acrylate, 2-dodecyl-1-hexadecyl (meth)acrylate, 1,2-octyl-1-dodecyl (meth)acrylate, 2-tetradecyloctadecyl (meth)acrylate, 1,2-tetradecyl-octadecyl (meth)acrylate and 2-hexadecyl-eicosyl (meth)acrylate, n-tetracosyl (meth)acrylate, n-triacontyl (meth)acrylate and/or n-hexatriacontyl (meth)acrylate.

In a particularly preferred embodiment, the $C_{1-30}$ alkyl (meth)acrylates include a mixture of $C_{1-4}$ alkyl (meth)acrylates and $C_{10-18}$ alkyl (meth)acrylates.

The term "$C_{10-18}$ alkyl(meth)acrylates" refers to esters of (meth)acrylic acid and straight chain or branched alcohols having 10 to 18 carbon atoms. The term encompasses individual (meth)acrylic esters with an alcohol of a particular length, and likewise mixtures of (meth)acrylic esters with alcohols of different lengths.

The suitable $C_{10-18}$ alkyl (meth)acrylates include, for example, decyl methacrylate, undecyl methacrylate, 5-methylundecyl methacrylate, dodecyl methacrylate, 2-methyldodecyl methacrylate, tridecyl methacrylate, 5-methyltridecyl methacrylate, tetradecyl methacrylate, pentadecyl methacrylate, hexadecyl (meth)acrylate, heptadecyl (meth)acrylate and/or octadecyl (meth)acrylate.

Particularly preferred $C_{10-18}$ alkyl (meth)acrylates are (meth)acrylic esters of a linear $C_{12-14}$ alcohol mixture ($C_{12-14}$ alkyl (meth)acrylate).

Preferably, the monomer composition comprises as component (c) 1 to 80% by weight of one or more $C_{1-4}$ alkyl (meth)acrylates and 0.1 to 18% by weight of one or more $C_{10-18}$ alkyl (meth)acrylates, preferably 1 to 80% by weight of one or more $C_{1-4}$ alkyl (meth)acrylates and 0.1 to 15% by weight of one or more $C_{10-18}$ alkyl (meth)acrylates, more preferably 5 to 70% by weight of one or more $C_{1-4}$ alkyl (meth)acrylates and 0.1 to 10% by weight of one or more $C_{10-18}$ alkyl (meth)acrylates, most preferably 7 to 68% by weight of one or more $C_{1-4}$ alkyl (meth)acrylates and 0.2 to 8% by weight of one or more $C_{10-18}$ alkyl (meth)acrylates, based on the total weight of the monomer composition.

In one embodiment, the monomer composition comprises as component (c) 0.2 to 17% by weight methyl(meth)acrylate, 7 to 55% by weight butyl(meth)acrylate and 0.2 to 8% by weight of one or more $C_{10-18}$ alkyl (meth)acrylates, based on the total weight of the monomer composition.

In one embodiment, the monomer composition comprises as component (c) 0.2 to 17% by weight methyl (meth)acrylate, 10 to 54% by weight butyl (meth)acrylate and 0.2 to 8% by weight of one or more $C_{12-14}$ alkyl (meth)acrylates, based on the total weight of the monomer composition.

Additional Monomers

Preferably, the monomer composition comprises additional monomers (component d) in addition to the components (a) to (c).

Additional monomers which can be used in accordance with the invention are selected from the group consisting of styrene monomers having from 8 to 17 carbon atoms, vinyl esters having from 1 to 11 carbon atoms in the acyl group, vinyl ethers having from 1 to 10 carbon atoms in the alcohol group, dispersing oxygen- and/or nitrogen-functionalized monomers, heterocyclic (meth)acrylates, heterocyclic vinyl compounds, monomers containing a covalently bonded phosphorous atom, monomers containing epoxy groups and monomers containing halogens.

Suitable styrene monomers having from 8 to 17 carbon atoms are selected from the group consisting of styrene, substituted styrenes having an alkyl substituent in the side chain, for example alpha-methyl styrene and alpha-ethyl styrene, substituted styrenes having an alkyl substituent on the ring, such as vinyltoluene and para-methylstyrene, halogenated styrenes, for example monochlorostyrenes, dichlorostyrenes, tribromostyrenes and tetrabromostyrenes, nitrostyrene; styrene being preferred.

Suitable vinyl esters having from 1 to 11 carbon atoms in the acyl group are selected from the group consisting of vinyl formate, vinyl acetate, vinyl propionate, vinyl butyrate; preferably vinyl esters including from 2 to 9, more preferably from 2 to 5 carbon atoms in the acyl group, wherein the acyl group may be linear or branched.

Suitable vinyl ethers having from 1 to 10 carbon atoms in the alcohol group are selected from the group consisting of vinyl methyl ether, vinyl ethyl ether, vinyl propyl ether, vinyl butyl ether; preferably vinyl ethers including from 1 to 8, more preferably from 1 to 4 carbon atoms in the alcohol group, wherein the alcohol group may be linear or branched.

Suitable monomers which are derived from dispersing oxygen- and/or nitrogen-functionalized monomers are selected from the group consisting of aminoalkyl (meth)acrylates, such as N,N-dimethylaminoethyl (meth)acrylate, N,N-dimethylaminopropyl (meth)acrylate, N,N-diethylaminopentyl (meth)acrylate, N,N-dibutylaminohexadecyl (meth)acrylate; aminoalkyl (meth)acrylamides, such as N,N-dimethylaminopropyl (meth)acrylamide; hydroxyalkyl (meth)acrylates, such as 3-hydroxypropyl (meth)acrylate, 3,4-dihydroxybutyl (meth)acrylate, 2-hydroxyethyl (meth)acrylate, 2-hydroxypropyl (meth)acrylate, 2,5-dimethyl-1,6-hexanediol (meth)acrylate, 1,10-decanediol (meth)acrylate, p-hydroxystyrene, vinyl alcohol, alkenols ((methyl)allyl alcohol having 3 to 12 carbon atoms), multivalent (3-8 valent) alcohol (glycerol, pentaerythritol, sorbitol, sorbitan, diglycerides, sugars) ether or (meth)acrylate; $C_{1-8}$-alkyloxy-$C_{2-4}$-alkyl (meth)acrylates, such as methoxypropyl (meth)acrylate, methoxy-butyl (meth)acrylate, methoxy heptyl (meth)acrylate, methoxy hexyl (meth)acrylate, methoxy pentyl (meth)acrylate, methoxy octyl (meth)acrylate, ethoxyethyl (meth)acrylate, ethoxypropyl (meth)acrylate, ethoxy-butyl (meth)acrylate, ethoxy heptyl (meth)acrylate, ethoxyhexyl (meth)acrylate, ethoxypentyl (meth)acrylate, ethoxyoctyl (meth)acrylate, propoxymethyl (meth)acrylate, propoxyethyl (meth)acrylate, propoxypropyl (meth)acrylate, propoxybutyl (meth)acrylate, propoxyheptyl (meth)acrylate, propoxyhexyl (meth)acrylate, propoxypentyl (meth)acrylate, propoxyoctyl (meth)acrylate, butoxymethyl (meth)acrylate, butoxyethyl (meth)acrylate, butoxypropyl (meth)acrylate, butoxybutyl (meth)acrylate, butoxyheptyl (meth)acrylate, butoxyhexyl (meth)acrylate, butoxypentyl (meth)acrylate and butoxyoctyl (meth)acrylate, ethoxyethyl (meth)acrylate and butoxyethyl (meth)acrylate are being preferred.

Suitable heterocyclic (meth)acrylates are selected form the group consisting of 2-(1-imidazolyl)ethyl (meth)acrylate, 2-(4-morpholinyl)ethyl (meth)acrylate, 1-(2-methacryloyloxyethyl)-2-pyrrolidone, N-methacryloylmorpholine, N-methacryloyl-2-pyrrolidinone, N-(2-methacryloyloxyethyl)-2-pyrrolidinone, N-(3-methacryloyloxypropyl)-2-pyrrolidinone.

Suitable heterocyclic vinyl compounds are selected from the group consisting of 2-vinylpyridine, 4-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, N-vinylpyrrolidine, 3-vinylpyrrolidine, N-vinylcaprolactam, N-vinylbutyrolactam, vinyloxolane, vinylfuran, vinyloxazoles and hydrogenated vinyloxazoles.

Monomers containing a covalently bonded phosphorous atom are selected from the group consisting of 2-(dimethylphosphato)propyl (meth)acrylate, 2-(ethylenephosphito) propyl (meth)acrylate, dimethylphosphinomethyl (meth)acrylate, dimethylphosphonoethyl (meth)acrylate, diethyl (meth)acryloyl phosphonate, dipropyl (meth)acryloyl phosphonate, 2 (dibutylphosphono)ethyl (meth)acrylate, diethylphosphatoethyl (meth)acrylate, 2-(dimethylphosphato)-3-hydroxypropyl (meth)acrylate, 2-(ethylenephosphito)-3-hydroxypropyl (meth)acrylate, 3-(meth)acryloyloxy-2-hydroxypropyl diethyl phosphonate, 3-(meth)acryloyloxy- 2-hydroxypropyl dipropyl phosphonate, 3-(dimethylphosphato)-2-hydroxypropyl (meth)acrylate, 3-(ethylenephosphito)-2-hydroxypropyl (meth)acrylate, 2-(meth)acryloyloxy-3-hydroxypropyl diethyl phosphonate, 2-(meth)acryloyloxy-3-hydroxypropyl dipropyl phosphonate and 2 (dibutylphosphono)-3-hydroxypropyl (meth)acrylate.

Suitable monomers containing epoxy groups are, for example, glycidyl (meth)acrylate and glycidyl (meth)allyl ether and the like.

Suitable monomers containing halogens are, for example, vinyl chloride, vinyl bromide, vinylidene chloride, (meth)allyl chloride and halogenated styrene (dichlorostyrene etc) and the like.

Preferably, the monomer composition comprises as component (d) 0 to 65% by weight, more preferably 0.1 to 65% by weight, even more preferably 0.2 to 65% by weight, most preferably 0.2 to 60% by weight additional monomers, based on the total weight of the monomer composition.

Preferably, the additional monomers are styrene monomers having from 8 to 17 carbon atoms.

In one embodiment, the monomer composition comprises as component (d) 0.1 to 65% by weight, more preferably 0.2 to 65% by weight, most preferably 0.2 to 60% by weight of one or more styrene monomers having from 8 to 17 carbon atoms, based on the total weight of the monomer composition.

Preferably, the amounts of components (a) to (d) add up to 100% by weight.

Preferable Monomer Compositions

In one embodiment, the monomer composition comprises
(a) 5 to 35% by weight, more preferably 15 to 35% by weight, most preferably 20 to 30% by weight of one or more esters of (meth)acrylic acid and a first hydroxylated hydrogenated polybutadiene having a number-average molecular weight of 1,000 to 2,750 g/mol, based on the total weight of the monomer composition;
(b) 1 to 15% by weight, more preferably 3 to 15% by weight, most preferably 4 to 10% by weight of one or more esters of (meth)acrylic acid and a second hydroxylated hydrogenated polybutadiene having a number-average molecular weight of 3,500 to 7,000 g/mol, based on the total weight of the monomer composition;
(c) 1 to 80% by weight of one or more $C_{1-4}$ alkyl (meth)acrylates and 0.1 to 15% by weight of one or more $C_{10-18}$ alkyl (meth)acrylates, more preferably 5 to 70% by weight of one or more $C_{1-4}$ alkyl (meth)acrylates and 0.1 to 10% by weight of one or more $C_{10-18}$ alkyl (meth)acrylates, most preferably 7 to 68% by weight of one or more $C_{1-4}$ alkyl (meth)acrylates and 0.2 to 8% by weight of one or more $C_{10-18}$ alkyl (meth)acrylates, based on the total weight of the monomer composition; and
(d) 0 to 65% by weight, more preferably 0.1 to 65% by weight, most preferably 0.2 to 65% by weight of one or more styrene monomers having from 8 to 17 carbon atoms, based on the total weight of the monomer composition
wherein the total weight of monomers (a) and (b) is at least 25% by weight, based on the total weight of the monomer composition, and
wherein the total weight of monomers (a), (b) and (c) is at least 35% by weight, based on the total weight of the monomer composition.

In one embodiment, the monomer composition comprises
(a) 20 to 30% by weight of one or more esters of (meth)acrylic acid and a first hydroxylated hydrogenated polybutadiene having a number-average molecular weight of 1,000 to 2,750 g/mol, based on the total weight of the monomer composition;
(b) 2 to 10% by weight of one or more esters of (meth)acrylic acid and a second hydroxylated hydrogenated polybutadiene having a number-average molecular weight of 3,500 to 7,000 g/mol, based on the total weight of the monomer composition;
(c) 7 to 68% by weight of one or more $C_{1-4}$ alkyl (meth)acrylates and 0.2 to 8% by weight of one or more $C_{10-18}$ alkyl (meth)acrylates, based on the total weight of the monomer composition; and
(d) 0.2 to 65% by weight of one or more styrene monomers having from 8 to 17 carbon atoms, based on the total weight of the monomer composition,
wherein the total weight of monomers (a) and (b) is at least 25% by weight, based on the total weight of the monomer composition, and
wherein the total weight of monomers (a), (b) and (c) is at least 35% by weight, based on the total weight of the monomer composition.

In one embodiment, the monomer composition comprises
(a) 20 to 30% by weight of one or more esters of (meth)acrylic acid and a first hydroxylated hydrogenated polybutadiene having a number-average molecular weight of 1,000 to 2,750 g/mol, based on the total weight of the monomer composition;
(b) 2 to 10% by weight of one or more esters of (meth)acrylic acid and a second hydroxylated hydrogenated polybutadiene having a number-average molecular weight of 3,500 to 7,000 g/mol, based on the total weight of the monomer composition;
(c) 0.2 to 17% by weight methyl(meth)acrylate, 7 to 55% by weight butyl(meth)acrylate and 0.2 to 8% by weight of one or more $C_{10-18}$ alkyl (meth)acrylates, based on the total weight of the monomer composition; and
(d) 0.2 to 65% by weight of one or more styrene monomers having from 8 to 17 carbon atoms
wherein the total weight of monomers (a) and (b) is at least 25% by weight, based on the total weight of the monomer composition, and
wherein the total weight of monomers (a), (b) and (c) is at least 35% by weight, based on the total weight of the monomer composition.

In one embodiment, the monomer composition comprises
(a) 20 to 27% by weight of one or more esters of (meth)acrylic acid and a first hydroxylated hydrogenated polybutadiene having a number-average molecular weight of 1,000 to 2,750 g/mol, based on the total weight of the monomer composition;
(b) 4 to 6% by weight of one or more esters of (meth)acrylic acid and a second hydroxylated hydrogenated polybutadiene having a number-average molecular weight of 3,500 to 7,000 g/mol, based on the total weight of the monomer composition;
(c) 0.2 to 17% by weight methyl (meth)acrylate, 10 to 54% by weight butyl(meth)acrylate and 0.2 to 8% by weight of one or more $C_{12-14}$ alkyl (meth)acrylates, based on the total weight of the monomer composition; and
(d) 0.2 to 61% by weight of one or more styrene monomers having from 8 to 17 carbon atoms, based on the total weight of the monomer composition wherein the total weight of monomers (a) and (b) is at least 25% by weight, based on the total weight of the monomer composition, and
wherein the total weight of monomers (a), (b) and (c) is at least 35% by weight, based on the total weight of the monomer composition.

Preferably, the (meth)acrylic esters mentioned above are esters of methacrylic acid.

Manufacturing Method

The invention also relates to a method for manufacturing the above-mentioned polymers, the method comprising the steps of:

(a) providing a monomer composition as describe above; and (b) initiating radical polymerization in the monomer composition.

Standard free-radical polymerization is detailed, inter alia, in Ullmann's Encyclopedia of Industrial Chemistry, Sixth Edition. In general, a polymerization initiator and optionally a chain transfer agent are used for this purpose.

The ATRP method is known per se. It is assumed that this is a "living" free-radical polymerization, but no restriction is intended by the description of the mechanism. In these processes, a transition metal compound is reacted with a compound having a transferable atom group. This involves transfer of the transferable atom group to the transition metal compound, as a result of which the metal is oxidized. This reaction forms a free radical which adds onto ethylenic groups. However, the transfer of the atom group to the transition metal compound is reversible, and so the atom group is transferred back to the growing polymer chain, which results in formation of a controlled polymerization system. It is accordingly possible to control the formation of the polymer, the molecular weight and the molecular weight distribution.

This reaction regime is described, for example, by J.-S. Wang, et al., J. Am. Chem. Soc, vol. 117, p. 5614-5615 (1995), by Matyjaszewski, Macromolecules, vol. 28, p. 7901-7910 (1995). In addition, patent applications WO 96/30421, WO 97/47661, WO 97/18247, WO 98/40415 and WO 99/10387 disclose variants of the above-elucidated ATRP. In addition, the polymers of the invention can also be obtained via RAFT methods, for example. This method is described in detail, for example, in WO 98/01478 and WO 2004/083169.

The polymerization can be conducted under standard pressure, reduced pressure or elevated pressure. The polymerization temperature is also uncritical. In general, however, it is in the range from −20 to 200° C., preferably 50 to 150° C. and more preferably 80 to 130° C.

Preferably, the monomer composition provided in step (a) is diluted by addition of an oil to provide a reaction mixture. The amount of the monomer composition, i.e. the total amount of monomers, relative to the total weight of the reaction mixture is preferably 20 to 90% by weight, more preferably 40 to 80% by weight, most preferably 50 to 70% by weight.

Preferably, the oil used for diluting the monomer composition is an API Group I, II, III, IV or V oil, or a mixture thereof. Preferably, a Group III oil or a mixture thereof is used to dilute the monomer composition.

Preferably, step (b) comprises the addition of a radical initiator.

Suitable radical initiators are, for example, azo initiators, such as azobis-isobutyronitrile (AIBN), 2,2'-azobis(2-methylbutyronitrile) (AMBN) and 1,1-azobiscyclohexanecarbonitrile, and peroxy compounds such as methyl ethyl ketone peroxide, acetylacetone peroxide, dilauryl peroxide, tert-butyl per-2-ethylhexanoate, ketone peroxide, tert-butyl peroctoate, methyl isobutyl ketone peroxide, cyclohexanone peroxide, dibenzoyl peroxide, tert-butyl peroxybenzoate, tert-butyl peroxyisopropylcarbonate, 2,5-bis(2-ethylhexanoylperoxy)-2,5-dimethylhexane, tert-butyl peroxy-2-ethylhexanoate, tert-butyl peroxy-3,5,5-trimethylhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide and bis(4-tert-butylcyclohexyl) peroxydicarbonate.

Preferably, the radical initiator is selected from the group consisting of 2,2'-azobis(2-methylbutyronitrile), 2,2-bis(tert-butylperoxy)butane, tert-butylperoxy 2-ethylhexanoate, 1,1-di-tert-butylperoxy-3,3,5-trimethylcyclohexan, tert-butyl peroxybenzoate and tert-butylperoxy-3,5,5-trimethylhexanoat. Particularly preferred initiators are tert-butylperoxy 2-ethylhexanoate and 2,2-bis(tert-butylperoxy)butane.

Preferably, the total amount of radical initiator relative to the total weight of the monomer composition is 0.01 to 5% by weight, more preferably 0.02 to 1% by weight, most preferably 0.05 to 0.5% by weight.

The total amount of radical initiator may be added in a single step or the radical initiator may be added in several steps over the course of the polymerization reaction. Preferably, the radical initiator is added in several steps. For example, a part of the radical initiator may be added to initiate radical polymerization and a second part of the radical initiator may be added 0.5 to 3.5 hours after the initial dosage.

Preferably, step (b) also comprises the addition of a chain transfer agent. Suitable chain transfer agents are especially oil-soluble mercaptanes, for example n-dodecyl mercaptane or 2-mercaptoethanol, or else chain transfer agents from the class of the terpenes, for example terpinolene. Particularly preferred is the addition of n-dodecyl mercaptane.

Preferably, the total reaction time of the radical polymerization is 2 to 10 hours, more preferably 3 to 9 hours.

After completion of the radical polymerization, the obtained polymer is preferably further diluted with the above-mentioned oil to the desired viscosity. Preferably, the polymer is diluted to a concentration of 5 to 60% by weight polymer, more preferably 10 to 50% by weight, most preferably 20 to 40% by weight.

Use of the Polymer According to the Invention

The invention also relates to the use of the above-mentioned poly alkyl(meth)acrylate polymer as an additive for a lubricant composition for improving the viscosity index and shear-resistance of the lubricant composition. The polymer of the invention can thereby be used as a viscosity index improver that—while providing high VI to the lubricating oil composition—is highly soluble in the lubricating oil composition and allows to maintain excellent properties of the lubricating oil composition such as an excellent shear resistance.

The polymers of the present invention and the lubricant compositions comprising the polymers according to the invention are favorably used for driving system lubricating oils (such as manual transmission fluids, differential gear oils, automatic transmission fluids and belt-continuously variable transmission fluids, axle fluid formulations, dual clutch transmission fluids, and dedicated hybrid transmission fluids), hydraulic oils (such as hydraulic oils for machinery, power steering oils, shock absorber oils), engine oils (for gasoline engines and for diesel engines) and industrial oil formulations (such as wind turbine).

From the standpoint of the kinematic viscosity of the polymers according to the present invention, the weight content of the polymers in the lubricant composition is preferably comprised in the range from 1% by weight to 50% by weight, preferably from 1% by weight to 35% by weight, based on the total weight of the lubricant composition.

If the lubricant composition according to the present invention is used as an engine oil, it preferably comprises from 1% by weight to 20% by weight, more preferably from 1% by weight to 15% by weight of the polymers according to the invention, based on the total weight of the lubricant composition, leading to a kinematic viscosity at 100° C. being in the range from 4 mm²/s to 10 mm²/s according to ASTM D445.

If the lubricant composition of the present invention is used as an automotive gear oil, it preferably comprises from 1% by weight to 35% by weight, more preferably from 1% by weight to 25% by weight of the polymers according to the invention, based on the total weight of the lubricant composition, leading to a kinematic viscosity at 100° C. being in the range from 2 mm²/s to 15 mm²/s according to ASTM D445.

If the lubricant composition of the present invention is used as an automatic transmission oil, it preferably comprises from 1% by weight to 25% by weight, more preferably from 1% by weight to 18% by weight of the polymers according to the invention, based on the total weight of the lubricant composition, leading to a kinematic viscosity at 100° C. being in the range from 2 mm²/s to 6 mm²/s according to ASTM D445.

If the lubricant composition of the present invention is used as an industrial gear oil, it preferably comprises from 10% by weight to 50% by weight, more preferably from 10% by weight to 35% by weight of the polymers according to the invention, based on the total weight of the lubricant composition, leading to a kinematic viscosity at 100° C. being in the range from 10 mm²/s to 40 mm²/s according to ASTM D445.

Preferably, the polymer is used for preventing a decrease in the kinematic viscosity of the lubricant after shearing.

The kinematic viscosity may be measured according to ASTM D445. Preferably, the kinematic viscosity is measured at a temperature of 100° C., 40° C. and/or −10° C.

The shear-resistance is preferably evaluated by measuring the lubricant's properties before and after subjecting the lubricant to shearing according to DIN 51350—Part 6. Preferably, shearing is effected using a tapered roller bearing according to DIN 51350—Part 6 for 192 hours with 1450 rpm at 60° C.

Preferably, the polymer is used to achieve a ratio of the kinematic viscosity at 40° C. and/or −10° C. before shearing relative to the kinematic viscosity at 40° C. and/or −10° C. after shearing of more than 1, more preferably of 1 to 1.15, most preferably of 1 to 1.05.

Compositions

The invention also relates to a composition comprising
(a) a base oil; and
(b) a the above-mentioned poly alkyl(meth)acrylate polymer.

Due to the presence of the polymer according to the invention, the compositions have excellent shear-stability while the polymers of the invention maintain their solubility after shear in the lubricant compositions. The compositions according to the invention can thus preferably be used as transmission fluid.

The composition may be an additive composition comprising the polymer according to the invention and a base oil as diluent. The additive composition may, for example, be added as a viscosity index improver to lubricants. Typically, the additive composition comprises a relatively high amount of polymer according to the invention.

The composition may also represent a lubricant composition comprising the polymer according to the invention, a base oil and optionally further additives as discussed below. The lubricant composition may, for example, be used as a transmission fluid or an engine oil. Typically, the lubricant composition comprises a lower amount of polymer according to the invention as compared to the aforementioned additive composition.

If the composition is used as an additive composition, the amount of base oil (component a) preferably is 40 to 80% by weight, more preferably 50 to 70% by weight and the amount of polymer (component b) preferably is 20 to 60% by weight, more preferably 30 to 50% by weight, based on the total weight of the additive composition.

If the composition is used as a lubricant composition, the amount of base oil (component a) is preferably 50 to 99.5% by weight, more preferably 65 to 99.5% by weight, even more preferably 75 to 97% by weight, and the amount of polymer (component b) preferably is 0.5 to 50% by weight, more preferably 0.5 to 35% by weight, even more preferably 3 to 25% by weight, based on the total weight of the lubricant composition.

Preferably, the amounts of (a) and (b) add up to 100% by weight.

The base oil to be used in the composition preferably comprises an oil of lubricating viscosity. Such oils include natural and synthetic oils, oil derived from hydrocracking, hydrogenation, and hydro-finishing, unrefined, refined, re-refined oils or mixtures thereof.

The base oil may also be defined as specified by the American Petroleum Institute (API) (see April 2008 version of "Appendix E-API Base Oil Interchangeability Guidelines for Passenger Car Motor Oils and Diesel Engine Oils", section 1.3 Sub-heading 1.3. "Base Stock Categories").

The API currently defines five groups of lubricant base stocks (API 1509, Annex E—API Base Oil Interchangeability Guidelines for Passenger Car Motor Oils and Diesel Engine Oils, September 2011). Groups I, II and III are mineral oils which are classified by the amount of saturates and sulphur they contain and by their viscosity indices; Group IV are polyalphaolefins; and Group V are all others, including e.g. ester oils. The table below illustrates these API classifications.

| Group | Saturates | Sulphur content | Viscosity Index (VI) |
|---|---|---|---|
| I | <90% | >0.03% | 80-120 |
| II | at least 90% | not more than 0.03% | 80-120 |
| III | at least 90% | not more than 0.03% | at least 120 |
| IV | All polyalphaolefins (PAOs) | | |
| V | All others not included in Groups I, II, III or IV (e.g. ester oils) | | |

The kinematic viscosity at 100° C. ($KV_{100}$) of appropriate apolar base oils used to prepare a lubricant composition in accordance with the present invention is preferably in the range of 1 mm²/s to 10 mm²/s, more preferably in the range of 2 mm²/s to 8 mm²/s, according to ASTM D445.

Further base oils which can be used in accordance with the present invention are Group II-III Fischer-Tropsch derived base oils.

Fischer-Tropsch derived base oils are known in the art. By the term "Fischer-Tropsch derived" is meant that a base oil is, or is derived from, a synthesis product of a Fischer-Tropsch process. A Fischer-Tropsch derived base oil may also be referred to as a GTL (Gas-To-Liquids) base oil. Suitable Fischer-Tropsch derived base oils that may be conveniently used as the base oil in the lubricating composition of the present invention are those as for example disclosed in EP 0 776 959, EP 0 668 342, WO 97/21788, WO 00/15736, WO 00/14188, WO 00/14187, WO 00/14183, WO 00/14179, WO 00/08115, WO 99/41332, EP 1 029 029, WO 01/18156, WO 01/57166 and WO 2013/189951.

Especially for transmission oil formulations, base oils of API Group III and mixtures of different Group III oils are used. In a preferred embodiment, the base oil may also be a polyalphaolefin base oil or a mixture of a polyalphaolefin base oil with an API Group III base oil or a mixture of API Group III base oils.

The lubricant compositions according to the present invention are further characterized by their low kinematic viscosity at temperatures of 40° C. or less. The $KV_{40}$ is preferably below 25 mm²/s, more preferably 18 to 24 mm²/s, most preferably 20 to 23 mm²/s. The $KV_{40}$ is the kinematic viscosity at 40° C. and may be measured according to ASTM D445.

The lubricant composition preferably has a viscosity index of more than 150. The viscosity index may be measured according to ASTM D2270.

The lubricant composition preferably is a transmission fluid or an engine oil.

The lubricant composition according to the invention may also contain, as component (c), further additives selected from the group consisting of friction modifiers, dispersants, defoamers, detergents, antioxidants, pour point depressants, antiwear additives, extreme pressure additives, anticorrosion additives, dyes and mixtures thereof.

Appropriate dispersants include poly (isobutylene) derivatives, for example poly (isobutylene)succinimides (PIBSIs), including borated PIBSIs; and ethylene-propylene oligomers having N/O functionalities.

Dispersants (including borated dispersants) are preferably used in an amount of 0 to 5% by weight, based on the total amount of the lubricant composition.

Suitable defoamers are silicone oils, fluorosilicone oils, fluoroalkyl ethers, etc.

The defoaming agent is preferably used in an amount of 0.005 to 0.1% by weight, based on the total amount of the lubricant composition.

The preferred detergents include metal-containing compounds, for example phenoxides; salicylates; thiophosphonates, especially thiopyrophosphonates, thiophosphonates and phosphonates; sulfonates and carbonates. As metal, these compounds may contain especially calcium, magnesium and barium. These compounds may preferably be used in neutral or overbased form.

Detergents are preferably used in an amount of 0.2 to 1% by weight, based on the total amount of the lubricant composition.

The suitable antioxidants include, for example, phenol-based antioxidants and amine-based antioxidants.

Phenol-based antioxidants include, for example, octadecyl-3-(3,5-di-tert-butyl-4-hydroxyphenyl)propionate; 4,4'-methylenebis(2,6-di-tert-butylphenol); 4,4'-bis(2,6-di-t-butylphenol); 4,4'-bis(2-methyl-6-t-butylphenol); 2,2'-methylenebis(4-ethyl-6-t-butylphenol); 2,2'-methylenebis(4-methyl-6-t-butyl phenol); 4,4'-butylidenebis(3-methyl-6-t-butylphenol); 4,4'-isopropylidenebis(2,6-di-t-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-t-butyl-4-methylphenol; 2,6-di-t-butyl-4-ethyl-phenol; 2,4-dimethyl-6-t-butylphenol; 2,6-di-t-amyl-p-cresol; 2,6-di-t-butyi-4-(N,N'-dimethylaminomethylphenol); 4,4'thiobis(2-methyl-6-t-butylphenol); 4,4'-thiobis(3-methyl-6-t-butylphenol); 2,2'-thiobis(4-methyl-6-t-butylphenol); bis(3-methyl-4-hydroxy-5-t-butylbenzyl) sulfide; bis(3,5-di-t-butyl-4-hydroxybenzyl)sulfide; n-octyl-3-(4-hydroxy-3,5-di-t-butylphenyl)propionate; n-octadecyl-3-(4-hydroxy-3,5-di-t-butylphenyl)propionate; 2,2'-thio[diethyl-bis-3-(3,5-di-t-butyl-4-hydroxyphenyl)propionate], etc. Of those, especially preferred are bis-phenol-based antioxidants and ester group containing phenol-based antioxidants.

The amine-based antioxidants include, for example, monoalkyldiphenylamines such as monooctyldiphenylamine, monononyldiphenylamine, etc.; dialkyldiphenylamines such as 4,4'-dibutyldiphenylamine, 4,4'-dipentyldiphenylamine, 4,4'-dihexyldiphenylamine, 4,4'-diheptyldiphenylamine, 4,4'-dioctyldiphenylamine, 4,4'-dinonyldiphenylamine, etc.; polyalkyldiphenylamines such as tetrabutyldiphenylamine, tetrahexyldiphenylamine, tetraoctyldiphenylamine, tetranonyldiphenylamine, etc.; naphthylamines, concretely alpha-naphthylamine, phenyl-alpha-naphthylamine and further alkyl-substituted phenyl-alpha-naphthylamines such as butylphenyl-alpha-naphthylamine, pentylphenyl-alpha-naphthylamine, hexylphenyl-alpha-naphthylamine, heptylphenyl-alpha-naphthylamine, octylphenyl-alpha-naphthylamine, nonylphenyl-alpha-naphthylamine, etc. Of those, diphenylamines are preferred to naphthylamines, from the viewpoint of the antioxidation effect thereof.

Suitable antioxidants may further be selected from the group consisting of compounds containing sulfur and phosphorus, for example metal dithiophosphates, for example zinc dithiophosphates (ZnDTPs), "OOS triesters"=reaction products of dithiophosphoric acid with activated double bonds from olefins, cyclopentadiene, norbornadiene, α-pinene, polybutene, acrylic esters, maleic esters (ashless on combustion); organosulfur compounds, for example dialkyl sulfides, diaryl sulfides, polysulfides, modified thiols, thiophene derivatives, xanthates, thioglycols, thioaldehydes, sulfur-containing carboxylic acids; heterocyclic sulfur/nitrogen compounds, especially dialkyldimercaptothiadiazoles, 2-mercaptobenzimidazoles; zinc bis(dialkyldithiocarbamate) and methylene bis(dialkyldithiocarbamate); organophosphorus compounds, for example triaryl and trialkyl phosphites; organocopper compounds and overbased calcium- and magnesium-based phenoxides and salicylates.

Antioxidants are used in an amount of 0 to 15% by weight, preferably 0.1 to 10% by weight, more preferably 0.5 to 5% by weight, based on the total amount of the lubricant composition. The pour-point depressants include ethylene-vinyl acetate copolymers, chlorinated paraffin-naphthalene condensates, chlorinated paraffin-phenol condensates, polymethacrylates, polyalkylstyrenes, etc. Preferred are polymethacrylates having a weight-average molecular weight of from 5,000 to 200,000 g/mol.

The amount of the pour point depressant is preferably from 0.1 to 5% by weight, based on the total amount of the lubricant composition.

The preferred antiwear and extreme pressure additives include sulfur-containing compounds such as zinc dithiophosphate, zinc di-$C_{3-12}$-alkyldithiophosphates (ZnDTPs), zinc phosphate, zinc dithiocarbamate, molybdenum dithiocarbamate, molybdenum dithiophosphate, disulfides, sulfurized olefins, sulfurized oils and fats, sulfurized esters, thiocarbonates, thiocarbamates, polysulfides, etc.; phosphorus-containing compounds such as phosphites, phosphates, for example trialkyl phosphates, triaryl phosphates, e.g. tricresyl phosphate, amine-neutralized mono- and dialkyl phosphates, ethoxylated mono- and dialkyl phosphates, phosphonates, phosphines, amine salts or metal salts of those compounds, etc.; sulfur and phosphorus-containing anti-wear agents such as thiophosphites, thiophosphates, thiophosphonates, amine salts or metal salts of those compounds, etc.

The antiwear agent may be present in an amount of 0 to 3% by weight, preferably 0.1 to 1.5% by weight, more preferably 0.5 to 0.9% by weight, based on the total amount of the lubricant composition.

The preferred friction modifiers may include mechanically active compounds, for example molybdenum disulphide, graphite (including fluorinated graphite), poly (trifluoroethylene), polyamide, polyimide; compounds which form adsorption layers, for example long-chain carboxylic acids, fatty acid esters, ethers, alcohols, amines, amides, imides; compounds which from layers through tribochemical reactions, for example saturated fatty acids, phosphoric acid and thiophosphoric esters, xanthogenates, sulphurized fatty acids; compounds which form polymer-like layers, for example ethoxylated dicarboxylic acid partial esters, dialkyl phthalates, methacrylates, unsaturated fatty acids, sulphurized olefins and organometallic compounds, for example molybdenum compounds (molybdenum dithiophosphates and molybdenum dithiocarbamates MoDTC) and their combinations with ZnDTPs, copper-containing organic compounds.

Some of the compounds listed above may fulfil multiple functions. ZnDTP, for example, is primarily an antiwear additive and extreme pressure additive, but also has the character of an antioxidant and corrosion inhibitor (here: metal passivator/deactivator).

The above-detailed additives are described in detail, inter alia, in T. Mang, W. Dresel (eds.): "Lubricants and Lubrication", Wiley-VCH, Weinheim 2001; R. M. Mortier, S. T. Orszulik (eds.): "Chemistry and Technology of Lubricants".

Preferably, the total concentration of the one or more additives (c) is up to 20% by weight, more preferably 0.05% to 15% by weight, more preferably 5% to 15% by weight, based on the total weight of the lubricant composition.

Preferably, the amounts of (a) to (c) add up to 100% by weight.

Examples

The invention is illustrated by the following examples.

| Abbreviations | |
|---|---|
| $C_1$ AMA | $C_1$-alkyl methacrylate (methyl methacrylate; MMA) |
| $C_4$ AMA | $C_4$-alkyl methacrylate (n-butyl methacrylate) |
| $C_{12/14}$ AMA | $C_{12/14}$-alkyl methacrylate |
| $C_{16/18}$ AMA | $C_{16/18}$-alkyl methacrylate |
| CTA | chain transfer agent (dodecyl mercaptane) |
| $f_{branch}$ | degree of branching in mol % |
| K40-factor | ratio of kinematic viscosity at 40° C. before and after shear, measured according to ASTM D445 |
| K-10-factor | ratio of kinematic viscosity at –10° C. before and after shear, measured according to ASTM D445 |
| KRL | tapered roller bearing |
| $KV_{-10}$ | kinematic viscosity at –10° C., measured according to ASTM D445 |
| $KV_{40}$ | kinematic viscosity at 40° C., measured according to ASTM D445 |

| Abbreviations | |
|---|---|
| $KV_{100}$ | kinematic viscosity at 100° C., measured according to ASTM D445 |
| MA-1 | macroalcohol of hydrogenated polybutadiene ($M_n$ = 2,000 g/mol) |
| MA-2 | macroalcohol of hydrogenated polybutadiene ($M_n$ = 4,750 g/mol) |
| MM-1 | macromonomer of hydrogenated polybutadiene with methacrylate functionality ($M_n$ = 2,000 g/mol) |
| MM-2 | macromonomer of hydrogenated polybutadiene with methacrylate functionality ($M_n$ = 4,750 g/mol) |
| $M_n$ | number-average molecular weight |
| $M_w$ | weight-average molecular weight |
| NB3020 | Nexbase ®3020, Group III base oil from Neste with a $KV_{100}$ of 2.2 cSt |
| NB3043 | Nexbase ®3043, Group III base oil from Neste with a $KV_{100}$ of 4.3 cSt |
| OEM | original equipment manufacturer |
| PDI | polydispersity index, molecular weight distribution calculated via $M_w/M_n$ |
| PSSI100 | permanent shear stability index (calculation based on KV100 before and after shear) |
| RC9300 | ADDITIN ® RC9300, DI package from Lanxess |
| VI | viscosity index, measured according to ASTM D2270 |

Test Methods

The polymers according to the invention and comparative examples were characterized with respect to their molecular weight and PDI.

Molecular weights of the polymers were determined by GPC using commercially available polymethylmethacrylate (PMMA) standards. The determination is effected by gel permeation chromatography with THF as eluent (flow rate: 1 mL/min; injected volume: 100 µL).

The number-average molecular weight $M_n$ of the macromonomer is determined by GPC using commercially available polybutadiene standards. The determination is effected to DIN 55672-1 by gel permeation chromatography with THF as eluent.

The additive compositions including the polymers according to the invention and comparative examples were characterized with respect to their viscosity index (VI) according to ASTM D 2270, kinematic viscosity at –10° C. ($KV_{-10}$), 40° C. ($KV_{40}$) and 100° C. ($KV_{100}$) according to ASTM D445.

The shear-stability was investigated via KRL (Kegelrollenlager, engl.: tapered roller bearing) according to DIN51350—Part 6 for 192 h with 1450 rpm at 60° C.

To show the shear stability of the additive compositions, the PSSI (Permanent Shear Stability Index) was calculated according to ASTM D 6022-01 (Standard Practice for Calculation of Permanent Shear Stability Index).

Synthesis of Macroalcohols (Hydroxylated Hydrogenated Polybutadiene) MA-1 and MA-2

The macroalcohol was synthesized by anionic polymerization of 1,3-butadiene with butyllithium at 20-45° C. On attainment of the desired degree of polymerization, the reaction was stopped by adding propylene oxide and lithium was removed by precipitation with methanol. Subsequently, the polymer was hydrogenated under a hydrogen atmosphere in the presence of a noble metal catalyst at up to 140° C. and 200 bar pressure. After the hydrogenation had ended, the noble metal catalyst was removed and organic solvent was drawn off under reduced pressure. Finally, MA-2 was diluted with NB3020 to a polymer content of 70% by weight. MA-1 was kept 100%. Table 1 summarizes the characterization data of MA-1 and MA-2.

TABLE 1

Characterization data of used macromonomers.

|  | $M_n$ [g/mol] | Hydrogenation level [%] | OH functionality [%] |
|---|---|---|---|
| MA-1 | 2,000 | >99 | >98 |
| MA-2 | 4,750 | >99 | >98 |

Synthesis of Macromonomers MM-1 and MM-2

In a 2 L stirred apparatus equipped with saber stirrer, air inlet tube, thermocouple with controller, heating mantle, column having a random packing of 3 mm wire spirals, vapor divider, top thermometer, reflux condenser and substrate cooler, 1000 g of the above-described macroalcohols are dissolved in methyl methacrylate (MMA) by stirring at 60° C. Added to the solution are 20 ppm of 2,2,6,6-tetramethylpiperidin-1-oxyl radical and 200 ppm of hydroquinone monomethyl ether. After heating to MMA reflux (bottom temperature about 110° C.) while passing air through for stabilization, about 20 mL of MMA are distilled off for azeotropic drying. After cooling to 95° C., $LiOCH_3$ is added and the mixture is heated back to reflux. After the reaction time of about 1 hour, the top temperature has fallen to ~64° C. because of methanol formation. The methanol/MMA azeotrope formed, is distilled off constantly until a constant top temperature of about 100° C. is established again. At this temperature, the mixture is left to react for a further hour. For further workup, the bulk of MMA is drawn off under reduced pressure. Insoluble catalyst residues are removed by pressure filtration (Seitz T1000 depth filter).

Table 2 summarizes the macroalcohol, MMA and $LiOCH_3$ amounts used for the synthesis of macromonomers MM-1 and MM-2.

Synthesis of Polymers According to the Present Invention

An apparatus with 4-neck flask and precision glass saber stirrer is charged with the monomer composition whose composition is shown in Table 3 and the polymerization oil NB3020 is added, so that the concentration of monomers in oil is 60 wt %. After heating to 115° C. under nitrogen, a 10 wt % solution of tert-butylperoxy-2-ethylhexanoate and dodecyl mercaptane in NB3020 is added within three hours with constant dosing rate. The reaction is maintained at 115° C. and 0.5 and 3.5 hours after the end of the initiator dosing, 0.2% (relative to the total amount of monomers) of 2,2-bis(tert-butylperoxy)butane are added. The reaction mixture is stirred at 115° C. for additional 2 hours and diluted to a 30 wt % solution of polymer in oil with NB3020 to obtain the final VII.

Table 3 shows the reaction mixtures used to prepare the working and comparative examples. The monomer components will add up to 100%. The amount of initiator and chain transfer agent is given relative to the total amount of monomers. The amount of monomers is 30 wt % of the final VII, the remaining 70 wt % is dilution oil (NB3020) as described above in the general proceedings used to prepare the polymers.

TABLE 3

Reaction mixtures used to prepare working examples and comparative examples.

| Ex | MM-1 [wt %] | MM-2 [wt %] | styrene [wt %] | $C_4$ AMA [wt %] | $C_1$ AMA [wt %] | $C_{12/14}$ AMA [wt %] | $C_{16/18}$ AMA [wt %] | $f_{branch}$ | Initiator [%] | CTA [%] | Weight ratio MM-1 to MM-2 |
|---|---|---|---|---|---|---|---|---|---|---|---|
| 1 | 20.4 | 5.3 | 0.2 | 52.2 | 14.6 | 7.3 | — | 2.04 | 0.40 | 0.47 | 3.85 |
| 2* | 23.3 | — | 0.2 | 53.8 | 15.1 | 7.6 | — | 2.04 | 0.40 | 0.73 | — |
| 3* | — | 41.9 | 0.2 | 40.7 | 11.4 | 5.8 | — | 2.04 | 0.40 | 0.51 | — |
| 4 | 26.0 | 5.0 | 58.6 | 10.0 | 0.2 | 0.2 | — | 2.16 | 0.40 | 0.40 | 5.2 |
| 5* | 29.0 | — | 60.3 | 10.3 | 0.2 | 0.2 | — | 2.16 | 0.40 | 0.80 | — |
| 6* | — | 49.2 | 43.1 | 7.3 | 0.2 | 0.2 | — | 2.16 | 0.40 | 0.80 | — |
| 7 | 25.0 | 5.0 | 16.5 | 33.9 | 15.9 | 3.7 | — | 2.32 | 0.40 | 0.40 | 5.0 |
| 8* | 27.9 | — | 17.0 | 34.9 | 16.4 | 3.8 | — | 2.32 | 0.40 | 0.40 | — |
| 9* | — | 47.9 | 12.3 | 25.2 | 11.8 | 2.8 | — | 2.32 | 0.40 | 0.30 | — |
| 10 | 23.3 | 4.8 | 60.9 | 10.6 | 0.2 | 0.2 | — | 1.87 | 0.40 | 0.95 | 4.85 |
| 11* | 26.0 | — | 62.7 | 10.9 | 0.2 | 0.2 | — | 1.87 | 0.40 | 0.80 | — |
| 12* | 25.0 | — | 17.7 | 36.3 | 17.0 | 4.0 | — | 2.00 | 0.40 | 0.40 | — |
| 13* | 25.0 | — | 0.2 | 55.0 | 14.8 | — | 5.0 | 2.20 | 0.18 | 0.10 | — |
| 14 | 25.0 | 5.0 | — | 50.0 | 15.0 | — | 5.0 | 2.56 | 0.40 | 1.90 | 5.0 |
| 15 | 20.0 | 5.0 | — | 51.2 | 16.2 | 7.6 | — | 1.97 | 0.40 | 1.90 | 4.0 |
| 16 | 22.0 | 5.0 | 15.0 | 35.4 | 15.0 | 3.8 | 3.8 | 2.08 | 0.40 | 0.40 | 4.4 |
| 17* | 13.0 | 22.0 | 13.0 | 35.4 | 12.8 | 3.8 | — | 2.11 | 0.40 | 0.40 | 0.6 |
| 18* | 40.0 | 5.0 | 15.0 | 32.4 | — | 7.6 | — | 4.99 | 0.40 | 0.80 | 8.0 |

*comparative examples

TABLE 2

Macroalcohols, MMA and catalyst amounts
for the transesterification of the macromonomers.

| Macromonomer | Macroalcohol | amount MMA [g] | amount $LiOCH_3$ [g] |
|---|---|---|---|
| MM-1 | MA-1 | 500 | 1.5 |
| MM-2 | MA-2 | 450 | 0.3 |

Seven working examples were prepared that include MM-1 and a small amount of MM-2 and are in accordance with the invention (examples 1, 4, 7, 10, 14, 15 and 16). The corresponding comparative examples (examples 2, 3, 5, 6, 8, 9, 11, 12 and 13) exhibit the same theoretical degree of branching as the working examples but are only based either on MM-1 or MM-2 and not a mixture of both macromonomers. Comparative examples 17 and 18 are prepared using both macromonomers MM-1 and MM-2, but with an amount outside the weight ranges for components (a) and (b) as claimed in the present invention.

To obtain comparable shear data, working examples and the corresponding comparative examples were prepared so that they exhibit a comparable weight-average molecular weight ($M_w$). The obtained values for each example and their polydispersity indices (PDI) are given in Table 4.

TABLE 4

Weight-average molecular weight ($M_w$) and polydispersity indices (PDI) of working and comparative examples.

| Example | $M_w$ [g/mol] | PDI |
|---|---|---|
| 1 | 70,100 | 2.78 |
| 2* | 73,000 | 3.05 |
| 3* | 72,600 | 2.25 |
| 4 | 73,700 | 2.92 |
| 5* | 78,000 | 3.28 |
| 6* | 74,100 | 2.95 |
| 7 | 125,000 | 3.58 |
| 8* | 115,000 | 3.61 |
| 9* | 133,000 | 3.24 |
| 10 | 65,400 | 3.16 |
| 11* | 66,800 | 2.90 |
| 12* | 115,000 | 3.51 |
| 13* | 300,000 | 4.53 |
| 14 | 129,000 | 5.52 |
| 15 | 104,000 | 4.76 |
| 16 | 145,000 | 3.85 |
| 17* | 136,000 | 3.56 |
| 18* | 84,200 | 3.64 |

*comparative examples

Evaluation of VI Improver Candidates

To demonstrate the improved effect of the polymers comprising a mixture of both the longer and shorter macromonomers according to the invention in shear-resistance and their improved solubility after shear, corresponding additive compositions of polymers in base oil were prepared and the corresponding permanent shear-losses and solubility after shear were determined. The results are summarized in Table 5.

The permanent shear-loss was determined with the KRL according to DIN51350—Part 6 for 192 h with 1450 rpm at 60° C. The solubility after shear was determined via visual inspection. An additional first indicator for solubility is the comparison of the KV40 and KV-10 values before and after shearing. At low temperatures, the sheared polar parts of the polymer start to associate which leads to higher KV40 and KV-10 values after shear compared to the values before shearing. As the molecular weight during shearing decreases, usually also KV100 and KV40 decrease after shearing. If higher values for KV40 or even more pronounced at KV-10 can be seen, this is an indicator that solubility of the polymer after shear is already borderline. Therefore, the K40-factor, which is defined as the ratio of the kinematic viscosity at 40° C. before shearing and the kinematic viscosity at 40° C. after shearing has to be bigger than 1, in order to have a balanced solubility. The same holds for the K-10-factor, which is defined as the ratio of the kinematic viscosity at −10° C. before shearing and the kinematic viscosity at −10° C. after shearing.

All polymers were dissolved in NB3043 and the treat rate adjusted so that the KV100 of the formulation was 5.5 cSt. Additionally, 0.6% of DI package (RC9300) were added for KRL protection purposes only. The kinematic viscosity data, PSSI100, visual appearance and K-factors of the formulations are given in Table 5.

Comparative example 3, which includes MM-2 as a single macromonomer, has good K40- and K-10-factors indicating a sufficient solubility after shear. However, the VI is lower and the PSSI100 value is higher compared to the inventive examples. Hence, the use of a single macromonomer yields a worse overall performance over the use a combination of two different macromonomers.

Similar results are obtained by comparative examples 6 and 9. In addition, the examples yield turbid solutions after shear indicating an insufficient shear-stability, despite K-factors of larger than 1. This indicates the presence of insoluble degradation products after shear. The presence of these insoluble products does not contribute to the measured KV values. Therefore, the KV values do not reflect the performance of the lubricant in a real application scenario and cannot be used to judge the performance of the VIIs.

In conclusion, pure MM-2 based polymers do not show the targeted balance between high VI, very good shear-stability and solubility after shear.

The comparative examples that include MM-1 as a single macromonomer (comparative examples 2, 5, 8, 11-13) exceed by far the performance of the MM-2 based combs in terms of VI and shear-stability. However, their drawback is in the solubility after shear as can be seen in either the K40- or K-10-factor. At least one of the two values is below 1 for the mentioned MM-1 based examples. Additionally, examples 5 and 13 are also turbid after shear, showing that the solubility after shear for the purely MM-1 based polymers is not sufficient.

Surprisingly, it was found that by replacing a small amount of MM-1 with MM-2 while keeping the degree of branching constant leads to an improvement in solubility after shear while only slightly influencing the VI and shear-stability performance, thus giving the best-balanced system in overall performance. Working examples 1, 4, 7, 10, 14, 15 and 16 exhibit high VI values and excellent shear-stability comparable to purely MM-1 based polymers but exceed these polymers in terms of solubility after shear. Thus, a polymer with a mixture of MM-1 with a small amount of MM-2 gives excellent performance in VI, shear-stability and solubility after shear.

Comparative example 17 has a high amount of MM-2, namely 22% by weight which is higher than the upper range limit of 15% by weight for component (b) according to the invention. Example 17 exhibits a relatively low VI and a relatively high PSSI, which shows that the VI and shear-behavior is not as good and balanced as for the inventive examples.

Comparative example 18 has a high amount of MM-1, namely 40% by weight which is higher than the upper range limit of 35% by weight for component (a) according to the invention. Comparative example 18 shows a low VI and bad shear-stability.

The comparative examples show that the amount of each monomer needs to be thoroughly balanced in order to fulfill all requirements of a VII in terms of VI lift, shear-stability and fragment-stability after shear.

TABLE 5

Viscometric performance and PSSI100 of working and comparative examples.

| | | before shear | | | | after shear | | | | | | |
|---|---|---|---|---|---|---|---|---|---|---|---|---|
| Example | Treat rate [wt %] | KV100 [mm²/s] | KV40 [mm²/s] | KV-10 [mm²/s] | VI | KV100 [mm²/s] | KV40 [mm²/s] | KV-10 [mm²/s] | VI | PSSI100 [%] | Visual appearance | K40-factor | K-10-factor |
| 1 | 14.65 | 5.502 | 23.40 | 324.2 | 186 | 5.092 | 23.03 | 317.4 | 158 | 37.2 | clear | 1.02 | 1.02 |
| 2* | 15.40 | 5.496 | 23.12 | 312.9 | 189 | 4.842 | 25.44 | 309.1 | 132 | 59.7 | clear | 0.91 | 1.01 |
| 3* | 10.15 | 5.496 | 24.77 | 354.8 | 169 | 4.863 | 22.55 | 327.0 | 144 | 57.8 | clear | 1.10 | 1.09 |
| 4 | 13.85 | 5.497 | 23.47 | 328.9 | 185 | 5.193 | 22.93 | 325.9 | 167 | 27.7 | clear | 1.02 | 1.01 |
| 5* | 14.40 | 5.506 | 23.17 | 319.9 | 189 | 5.224 | 23.00 | 322.1 | 169 | 25.5 | slightly turbid | 1.01 | 0.99 |
| 6* | 8.80 | 5.498 | 24.85 | 360.2 | 168 | 4.797 | 22.44 | 340.5 | 139 | 63.9 | turbid | 1.11 | 1.06 |
| 7 | 15.15 | 5.501 | 23.34 | 328.1 | 187 | 5.144 | 22.87 | 319.8 | 164 | 32.4 | clear | 1.02 | 1.03 |
| 8* | 16.75 | 5.502 | 23.00 | 316.7 | 191 | 5.217 | 22.93 | 318.0 | 169 | 25.9 | clear | 1.00 | 0.99 |
| 9* | 9.80 | 5.501 | 24.56 | 358.8 | 172 | 4.838 | 22.45 | 340.3 | 143 | 60.2 | turbid | 1.09 | 1.05 |
| 10 | 14.90 | 5.495 | 23.45 | 326.3 | 185 | 5.259 | 23.08 | 319.8 | 171 | 21.5 | clear | 1.02 | 1.02 |
| 11* | 15.75 | 5.501 | 23.12 | 315.9 | 190 | 5.326 | 23.09 | 318.2 | 176 | 15.9 | clear | 1.00 | 0.99 |
| 12* | 17.70 | 5.504 | 22.89 | 312.5 | 193 | 5.297 | 22.95 | 313.4 | 175 | 18.8 | clear | 0.99 | 0.99 |
| 13* | 12.10 | 5.515 | 22.43 | 311.1 | 200 | 4.706 | 23.68 | 304.5 | 118 | 72.6 | slightly turbid | 0.95 | 1.02 |
| 14 | 14.70 | 5.500 | 23.37 | 319.0 | 186 | 5.000 | 22.77 | 311.2 | 153 | 45.5 | clear | 1.03 | 1.02 |
| 15 | 15.81 | 5.501 | 23.30 | 314.9 | 187 | 4.857 | 23.25 | 306.7 | 135 | 58.5 | clear | 1.00 | 1.03 |
| 16 | 14.22 | 5.508 | 22.99 | 311.7 | 192 | 5.182 | 22.62 | 308.1 | 170 | 29.4 | clear | 1.02 | 1.01 |
| 17* | 12.70 | 5.502 | 23.81 | 326.1 | 181 | 4.989 | 22.70 | 314.5 | 153 | 46.6 | clear | 1.05 | 1.04 |
| 18* | 9.58 | 5.508 | 24.18 | 326.2 | 177 | 4.808 | 22.14 | 314.4 | 139 | 63.2 | clear | 1.09 | 1.04 |

*comparative examples

The invention claimed is:

1. A poly alkyl(meth)acrylate polymer, obtained by polymerizing a monomer composition comprising:
    (a) from 15 to 35% by weight of one or more esters of a (meth)acrylic acid and a first hydroxylated hydrogenated polybutadiene having a number-average molecular weight of from 500 to less than 3,000 g/mol, based on the total weight of the monomer composition;
    (b) from 1 to 15% by weight of one or more esters of a (meth)acrylic acid and a second hydroxylated hydrogenated polybutadiene having a number-average molecular weight of from 3,000 to 10,000 g/mol, based on the total weight of the monomer composition;
    (c) from 5 to 90% by weight of one or more $C_1$-$C_{30}$ alkyl(meth)acrylates, based on the total weight of the monomer composition,
    wherein the total weight of monomers (a) and (b) is at least 25% by weight, based on the total weight of the monomer composition, and
    wherein the total weight of monomers (a), (b) and (c) is at least 35% by weight, based on the total weight of the monomer composition.

2. The polyalkyl(meth)acrylate polymer according to claim 1, wherein the weight ratio of component (a) to component (b) is 1 or more, and the polyalkyl(meth)acrylate polymer has a molar degree of branching $f_{branch}$ of 1 to 4.5 mol %.

3. The polyalkyl(meth)acrylate polymer according to claim 1, wherein the first hydroxylated hydrogenated polybutadiene has a number-average molecular weight of from 1,000 to 2,750 g/mol, and the second hydroxylated hydrogenated polybutadiene has a number-average molecular weight of 3,500 to 7,000 g/mol.

4. The polyalkyl(meth)acrylate polymer according to claim 1, wherein the monomer composition comprises as component (a) from 15 to 35% by weight, of one or more esters of (meth)acrylic acid and the first hydroxylated hydrogenated polybutadiene, based on the total weight of the monomer composition, and as component (b) from 3 to 15% by weight of one or more esters of (meth)acrylic acid and the second hydroxylated hydrogenated polybutadiene, based on the total weight of the monomer composition.

5. The polyalkyl(meth)acrylate polymer according to claim 1, wherein the monomer composition comprises as component (c) a mixture of one or more $C_{1-4}$ alkyl (meth)acrylates and one or more $C_{10-18}$ alkyl (meth)acrylates.

6. The polyalkyl(meth)acrylate polymer according to claim 1, wherein the monomer composition comprises as component (d) from 0.1 to 65% by weight of one or more monomers having from 8 to 17 carbon atoms selected from a group consisting of styrene and substituted styrenes having an alkyl substituent in the side chain, based on the total weight of the monomer composition.

7. The polyalkyl(meth)acrylate polymer according to claim 1, wherein the monomer composition comprises
    (a) from 20 to 30% by weight of one or more esters of (meth)acrylic acid and a first hydroxylated hydrogenated polybutadiene having a number-average molecular weight of from 1,000 to 2,750 g/mol, based on the total weight of the monomer composition;
    (b) from 2 to 10% by weight of one or more esters of (meth)acrylic acid and a second hydroxylated hydrogenated polybutadiene having a number-average molecular weight of from 3,500 to 7,000 g/mol, based on the total weight of the monomer composition;
    (c) from 7 to 68% by weight of one or more $C_{1-4}$ alkyl (meth)acrylates and from 0.2 to 8% by weight of one or more C.sub.10-18 alkyl (meth)acrylates, based on the total weight of the monomer composition; and (d) from 0.2 to 65% by weight of one or more styrene monomers having from 8 to 17 carbon atoms, based on the total weight of the monomer composition; and
    (d) from 0.2 to 65% by weight of one or more monomers having 8 to 17 carbon atoms selected from the group consisting of styrene and substituted styrenes having an alkyl substituent in the side chain based on the total weight of the monomer composition, and the polyalkyl (meth)acrylate polymer has a molar degree of branching $f_{branch}$ of 1 to 4.5 mol %.

8. The polyalkyl(meth)acrylate polymer according to claim 1, having a weight average molecular weight ($M_w$) of 15,000 to 350,000 g/mol.

9. A method for manufacturing a polyalkyl(meth)acrylate polymer, the method comprising the steps of: (a) providing a monomer composition according to claim 1; and (b) initiating radical polymerization in the monomer composition.

10. An additive for a lubricant composition for improving the viscosity index and the shear-resistance of the lubricant, the additive comprising the polyalkyl(meth)acrylate polymer according to claim 1.

11. A composition comprising: (a) a base oil; and (b) a polyalkyl(meth)acrylate polymer according to claim 1.

12. The composition according to claim 11, wherein the base oil is a polyalphaolefin base oil, an API Group III base oil, a mixture of a polyalphaolefin base oil with an API Group III base oil, or a mixture of API Group III base oils.

13. The composition according to claim 11, comprising 40 to 80% by weight base oil, and from 20 to 60% by weight of the polymer, based on the total weight of the composition.

14. The composition according to claim 11, comprising from 50 to 99.5% by weight base oil, and from 0.5 to 50% by weight of the polymer, based on the total weight of the composition.

15. The polyalkyl(meth)acrylate polymer according to claim 1, wherein the weight ratio of component (a) to component (b) is from 3.5 to 6.

16. The polyalkyl(meth)acrylate polymer according to claim 1, wherein the first hydroxylated hydrogenated polybutadiene has a number-average molecular weight of from 1,750 to 2,250 g/mol, and the second hydroxylated hydrogenated polybutadiene has a number-average molecular weight of from 4,500 to 5,000 g/mol.

17. The polyalkyl(meth)acrylate polymer according to claim 1, wherein the monomer composition comprises as component (a) from 20 to 30% by weight of one or more esters of (meth)acrylic acid and the first hydroxylated hydrogenated polybutadiene, based on the total weight of the monomer composition, and as component (b) from 4 to 10% by weight of one or more esters of (meth)acrylic acid and the second hydroxylated hydrogenated polybutadiene, based on the total weight of the monomer composition.

18. The polyalkyl(meth)acrylate polymer according to claim 1, wherein the monomer composition comprises as component (d) from 0.2 to 60% by weight of one or more styrene monomers having from 8 to 17 carbon atoms, based on the total weight of the monomer composition.

19. The polyalkyl(meth)acrylate polymer according to claim 1, having a weight average molecular weight ($M_w$) of from 60,000 to 150,000 g/mol.

20. The composition according to claim 11, comprising from 50 to 70% by weight base oil, and from 30 to 50% by weight of the polymer, based on the total weight of the composition.

* * * * *